United States Patent
Lee et al.

(10) Patent No.: US 12,283,714 B2
(45) Date of Patent: Apr. 22, 2025

(54) SEPARATOR STRUCTURE, METHOD FOR PRODUCING THE SAME, AND SECONDARY BATTERY USING THE SAME

(71) Applicant: LG ELECTRONICS INC., Seoul (KR)

(72) Inventors: Dongwook Lee, Seoul (KR); Munhyuk Lim, Seoul (KR); Hongjung Kim, Seoul (KR); Kyungho Jung, Seoul (KR); Juchul Lee, Seoul (KR); Junhan Kwon, Seoul (KR); Keeyong Kim, Seoul (KR); Sumin Lee, Seoul (KR); Yongkeon Ahn, Seoul (KR); Youngmin Pi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 17/646,925

(22) Filed: Jan. 4, 2022

(65) Prior Publication Data
US 2022/0302555 A1    Sep. 22, 2022

(30) Foreign Application Priority Data

Mar. 17, 2021   (KR) .................. 10-2021-0034807
May 21, 2021   (KR) .................. 10-2021-0065649

(51) Int. Cl.
*H01M 50/429*    (2021.01)
*H01M 50/403*    (2021.01)
(Continued)

(52) U.S. Cl.
CPC ..... *H01M 50/4295* (2021.01); *H01M 50/403* (2021.01); *H01M 50/44* (2021.01); *H01M 50/446* (2021.01)

(58) Field of Classification Search
CPC .......... H01M 50/4295; H01M 50/403; H01M 50/44; H01M 50/446
See application file for complete search history.

(56) References Cited

U.S. PATENT DOCUMENTS 5,962,162 A * 10/1999 Barrella ............ H01M 10/0525
                                                                 429/162
2019/0198839 A1   6/2019 Iwamuro et al.
(Continued)

FOREIGN PATENT DOCUMENTS

CN        105070865 A  * 11/2015  .......... H01M 50/403
JP        2018106865       7/2018
(Continued)

OTHER PUBLICATIONS

Google Machine English Translation of KR 20160133275, originally published to Kim Min Ji on Nov. 22, 2016 (Year: 2016).*
(Continued)

*Primary Examiner* — Niki Bakhtiari
*Assistant Examiner* — Niara Trant
(74) *Attorney, Agent, or Firm* — LEE, HONG, DEGERMAN, KANG & WAIMEY

(57) ABSTRACT

Disclosed are a separator for a lithium ion secondary battery, a method for producing the same, and a secondary battery using the same. A separator structure includes a support disposed inside a secondary battery. The support includes a porous polymer matrix, cellulose nano fibers dispersed in the matrix, and inorganic additives dispersed in the matrix, wherein at least some of the inorganic additives are attached to the cellulose nano fibers and are distributed in the matrix.

13 Claims, 22 Drawing Sheets

(51) Int. Cl.
    *H01M 50/44*     (2021.01)
    *H01M 50/446*     (2021.01)

(56) References Cited

U.S. PATENT DOCUMENTS

| | | | |
|---|---|---|---|
| 2020/0035972 A1 | 1/2020 | Ahn et al. | |
| 2021/0175483 A1* | 6/2021 | Cheng | H01M 10/0525 |
| 2021/0339449 A1* | 11/2021 | Nakajima | H01M 50/449 |

FOREIGN PATENT DOCUMENTS

| | | | | |
|---|---|---|---|---|
| JP | 2020070323 | | 5/2020 | |
| KR | 1020120083515 | | 7/2012 | |
| KR | 1020130141234 | | 12/2013 | |
| KR | 101465173 B1 * | | 11/2014 | H01M 10/052 |
| KR | 1020160133275 | | 11/2016 | |
| KR | 1020200042220 | | 4/2020 | |
| WO | WO-2018190645 A1 * | | 10/2018 | C08B 15/00 |
| WO | WO-2020149294 A1 * | | 7/2020 | B29B 7/002 |

OTHER PUBLICATIONS

EPO English Machine Translation of JP 2020070323, originally published to Aoki Takayuki on May 7, 2020 (Year: 2020).*
EPO English Machine Translation of KR 101465173 originally published to Lee Jun Young on Nov. 25, 2014 (Year: 2014).*
EPO English Machine Translation of CN 105070865 originally published to Gu Meifang on Nov. 18, 2015 (Year: 2015).*
EPO English Machine Translation of WO 2018190645 originally published to Kim H Sun on Oct. 18, 2018 (Year: 2018).*
PCT International Application No. PCT/KR2021/019726, International Search Report dated Apr. 14, 2022, 11 pages.
Korean Intellectual Property Office Application No. 10-2021-0065649, Office Action dated Apr. 10, 2023, 7 pages.

* cited by examiner

SEPARATOR STRUCTURE, METHOD FOR PRODUCING THE SAME, AND SECONDARY BATTERY USING THE SAME

CROSS-REFERENCE TO RELATED APPLICATIONS

Pursuant to 35 U.S.C. § 119 (a), this application claims the benefit of an earlier filing date and right of priority to Korean Patent Application Nos. 10-2021-0034807 filed on Mar. 17, 2021, and 10-2021-0065649 filed on May 21, 2021, the contents of all of which are hereby incorporated by reference herein in their entireties.

BACKGROUND OF THE DISCLOSURE

Field of the Disclosure

The present disclosure is applicable to a secondary battery-related technical field, and, for example, relates to a separator structure for a secondary battery, a method for producing the same, and a secondary battery using the same.

Discussion of the Related Art

A secondary battery including a lithium-ion battery is continuously charged/discharged during use and thus a temperature thereof rises up. Thus, a relatively high operating temperature range is required in the second battery, compared to other batteries.

In particular, secondary batteries for vehicles, including lithium-ion batteries, require high capacity and high output and have relatively large charge/discharge amounts compared to other batteries. Thus, a higher operating temperature range is required in the secondary battery. Therefore, a separator used in the secondary battery for a vehicle requires higher heat resistance and thermal stability than those required in a general separator.

A polyolefin separator fabric (matrix) has undergone heat shrinkage when a temperature thereof rises up due to battery operation. Thus, battery explosion may occur due to a short circuit between a positive electrode and a negative electrode. Therefore, it is required to improve heat resistance of the fabric (matrix) and to improve mechanical properties thereof.

Thus, it is necessary to improve the heat resistance and mechanical properties of the secondary battery separator matrix in order to realize high energy density and large-sized batteries.

SUMMARY OF THE DISCLOSURE

The present disclosure has a purpose to provide a separator structure in which heat resistance may be improved due to remarkably reduced thermal shrinkage at high temperatures, a method for producing the same, and a secondary battery using the same.

Further, the present disclosure has a purpose to provide a separator structure in which dispersibility, workability, and binding properties of a matrix and an additive may be improved, thereby improving stability and performance of a secondary battery, a method for producing the same, and a secondary battery using the same.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

In accordance with the present disclosure, the cellulose nano fibers having a low thermal expansion coefficient, and the inorganic additive may be applied to a matrix including polyolefin-based polymer. Further, the matrix, the cellulose nano fibers, and the inorganic additive may be treated using an organic additive. Thus, a secondary battery separator that may have improved heat resistance and mechanical properties may be achieved.

The cellulose nano fibers may be nanosized in a simple process in which surface-treatment using the organic additive may generate electrostatic repulsion and allow large particles to be formed to increase a spacing between the fibers.

Further, the polyolefin-based polymer matrix and the inorganic additive may constitute a composite to improve a binding force therebetween. Thus, a secondary battery separator with improved heat resistance may be achieved.

The thus surface-treated cellulose nano fibers may be produced by performing a reaction in which functional groups such as cationic, anionic, amphoteric, hydrophilic, hydrophobic, and amphiphilic groups are imparted to a pulp in aqueous solution, and then performing mechanical pulverization.

Each surface-treatment may be carried out by reacting the pulp with cationic groups (e.g., amine groups), anionic groups (e.g., carboxyl groups), amphoteric groups (including amine groups and/or carboxyl groups), hydrophilic groups (e.g., hydroxyl groups), hydrophobic groups (e.g., silane, rosin, AKD, alkyl groups), or amphiphilic groups (including hydrophilic groups and hydrophobic groups).

In addition, various composites between various polymers and the cellulose nano fibers may be achieved depending on types of the surface-treatment. Thus, the mechanical strength, porosity, and heat resistance of the secondary battery separator may be controlled by controlling a diameter, length, and content.

The organic and inorganic additives such as the additives ($Al_2O_3$, $SiO_2$, and metal carbonate) for improving heat resistance, and dispersants such as paraffin wax, urea, polyvinyl alcohol, polyethylene maleic anhydride, etc. may be introduced to improve heat resistance and dispersibility.

In one example, when metal carbonate ($CaCO_3$ or $MgCO_3$) is additionally used, an effect of adsorbing elements causing the lifespan reduction and explosion such as by-products (HF), etc., which may be generated during battery operation may be achieved, thereby improving the stability of the secondary battery.

In a first aspect of the present disclosure, a separator structure includes a support disposed inside a secondary battery, wherein the support includes a porous polymer matrix; cellulose nano fibers dispersed in the matrix; and inorganic additives dispersed in the matrix.

Further, at least some of the inorganic additives may be attached to the cellulose nano fibers and may be distributed in the matrix.

Further, the inorganic additive may be surface-treated using a surface-treatment agent and thus may be attached to the cellulose nano fibers.

Further, the surface-treatment may be performed using at least one of maleic acid and polydopamine.

Further, the surface-treatment agent may improve affinity of the inorganic additive to the cellulose nano fibers.

Further, the inorganic additive attached to the cellulose nano fibers may be located in at least one position in a longitudinal direction of the cellulose nano fibers.

Further, the inorganic additive attached to the cellulose nano fibers may have a spherical, ellipsoidal, or fibrous shape.

Further, the inorganic additive may include at least one of silica, fumed silica, fumed alumina, or metal carbonate.

Further, the cellulose nano fibers may be surface-treated using a surface modifier.

Further, the surface modifier may include at least one of maleic acid, polydopamine, carboxyl, acetate, phosphoric acid, sulfuric acid, amine, silane, succinic acid, and an alkyl compound.

Further, the surface modifier may improve a bonding force between the matrix and the cellulose nano fibers.

Further, the surface modifier may allow the cellulose nano fibers to at least partially have hydrophobicity.

Further, the matrix may be surface-treated using a surface-treatment agent.

Further, the surface-treatment may be performed using at least one of maleic acid and polydopamine.

Further, the matrix may include polyethylene and ultra-high molecular weight polypropylene (UHMWPP).

Further, the polyethylene and ultra-high molecular weight polypropylene (UHMWPP) may constitute network structures dispersed with each other.

In a second aspect of the present disclosure, a secondary battery may include a positive electrode; a negative electrode; a separator including a porous support positioned between the positive and negative electrodes; and an electrolyte located between the positive electrode and the separator and between the negative electrode and the separator, wherein the support includes a porous polymer matrix; cellulose nano fibers dispersed in the matrix; and inorganic additives dispersed in the matrix, wherein at least some of the inorganic additives may be attached to the cellulose nano fibers and may be distributed in the matrix.

In a third aspect of the present disclosure, a method for producing a separator including a support disposed inside the secondary battery may include preparing a porous polymer matrix; preparing cellulose nano fibers; dispersing the inorganic additive and the cellulose nano fibers in the matrix; and extruding the matrix in which the cellulose nano fibers, and the inorganic additive are dispersed.

Further, the step of dispersing the inorganic additive and the cellulose nano fibers in the matrix includes mixing the matrix, the cellulose nano fibers, an organic additive and the inorganic additive, so that at least a portion of the organic additive may treat a surface of the inorganic additive.

Further, in the mixing step, the surface-treated inorganic additive may be attached to the cellulose nano fibers.

Further, the surface-treatment of the inorganic additive may be performed using at least one of maleic acid and polydopamine.

Further, the surface-treatment may improve the affinity of the inorganic additive to the cellulose nano fibers.

Further, the step of dispersing the inorganic additive and the cellulose nano fibers in the matrix includes a step of performing surface-treatment of the inorganic additive; a step of dispersing the matrix, the cellulose nano fibers, and the surface-treated inorganic additive in a solvent; and removing the solvent.

Further, in the step of dispersing the matrix, the cellulose nano fibers, and the surface-treated inorganic additive in the solvent, the surface-treated inorganic additive may be attached to the cellulose nano fibers.

Further, the surface-treatment of the inorganic additive may be performed using at least one of maleic acid and polydopamine.

Further, the surface-treatment may improve the affinity of the inorganic additive to the cellulose nano fibers.

Further, the inorganic additive may include at least one of silica, fumed silica, fumed alumina, or metal carbonate.

Further, the method may further include a step of performing surface-treatment of the cellulose nano fibers using a surface modifier.

Further, the surface modifier may include at least one of maleic acid, polydopamine, carboxyl, acetate, phosphoric acid, sulfuric acid, amine, silane, succinic acid, and an alkyl compound.

Further, the surface modifier may improve the bonding force between the matrix and the cellulose nano fibers.

Further, the surface modifier may at least partially hydrophobize the cellulose nano fibers.

Further, the method may further include a step of performing surface-treatment of the matrix using a surface-treatment agent.

Further, the surface-treatment may be performed using at least one of maleic acid and polydopamine.

DESCRIPTION OF SPECIFIC EMBODIMENTS

Figure 1:
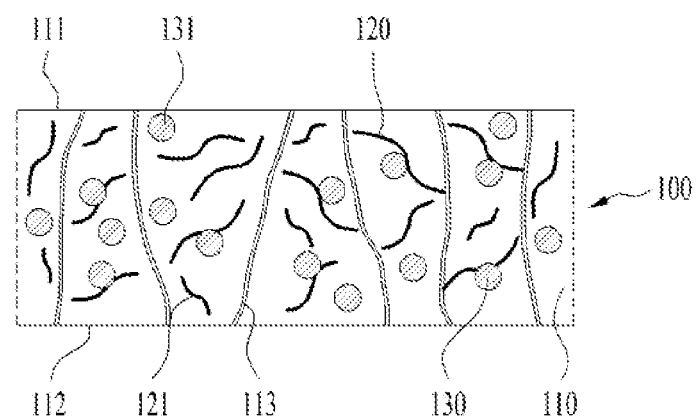
FIG. 1 is a cross-sectional schematic diagram showing a portion of a separator structure according to one embodiment of the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. A shape, a size, a ratio, an angle, a number, etc. disclosed in the drawings for describing an embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present. When a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

Figure 2:
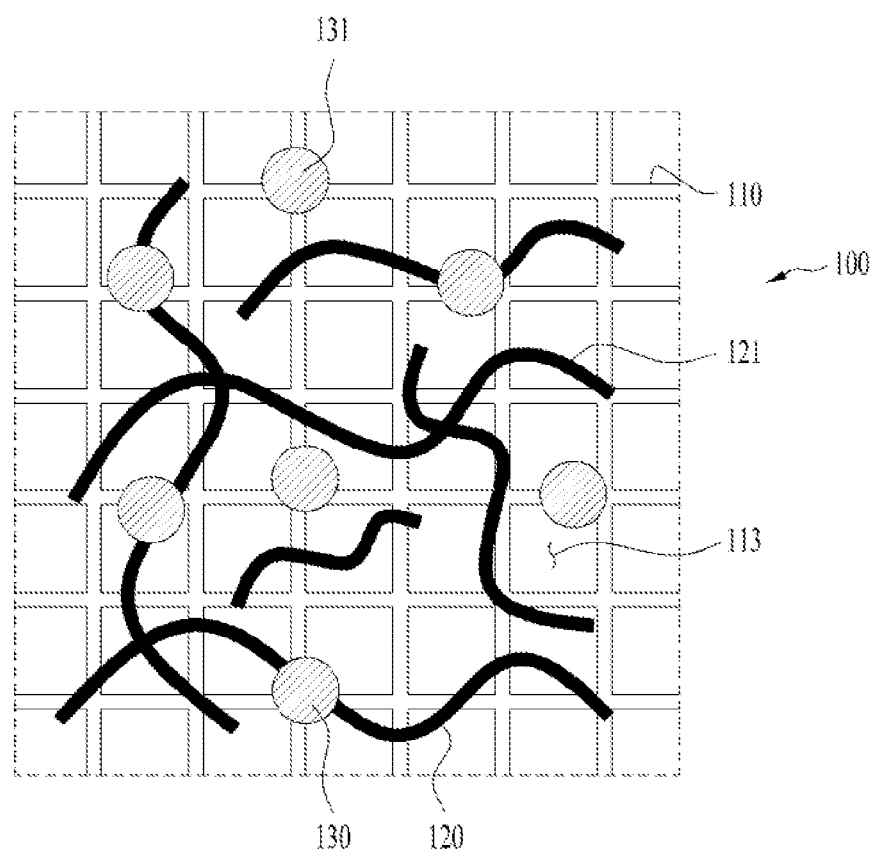
FIG. 2 is a plan schematic diagram showing a portion of a separator structure according to one embodiment of the present disclosure.

FIG. 1 is a cross-sectional schematic diagram showing a portion of the separator structure according to one embodiment of the present disclosure. FIG. 2 is a plan schematic diagram showing a portion of the separator structure according to one embodiment of the present disclosure.

FIG. 1 shows a horizontal cross-section of a support structure of a separator that may be disposed inside a secondary battery such as a lithium-ion battery. Further, FIG. 2 may represent an enlarged cross-section of a cross-section of FIG. 1.

Referring to FIG. 1 and FIG. 2, a support structure 100 may include a porous matrix 110 including a first face 111 and a second face 112, the cellulose nano fibers 120 and 121 dispersed in the matrix 110, and an inorganic additive 130 and 131 dispersed in the matrix 110.

In this connection, the matrix 110 may include a polyolefin-based polymer. This matrix 110 may constitute most of the separator, and pores 113 with a size of several tens of nm (see FIG. 2) may be contained therein.

The matrix 110 may be a porous base (fabric) having a plurality of holes 113 extending between the first face 111 and the second face 112, or may include such a porous base (fabric).

Specifically, the matrix 110 may be embodied as a porous film made of a polyolefin (PO)-based polymer resin such as polyethylene (PE) or polypropylene (PP) alone or in a mixed manner.

When the matrix 110 is exposed to a high temperature of about 120° C. or higher, the pores thereof may be closed to prevent the explosion of the battery. This may be referred to as a shut-down function.

The support 100 may constitute most of the secondary battery separator, and thus may mean the separator. When the support 100 contains inorganic particles, a combination of the support 100 and the inorganic particles may constitute the separator structure. That is, when the inorganic particles are absent, the support 100 may mean the separator. This is described below.

The inorganic additives 130 and 131 dispersed in the matrix 110 have great thermal stability, thereby to prevent the shrinkage of the polymer matrix 110. However, these inorganic additives 130 and 131 themselves may be locally aggregated, and thus may be non-uniformly dispersed in the matrix 110.

In this connection, according to an embodiment of the present disclosure, at least some 130 of the inorganic additives 130 and 131 may be attached to the cellulose nano fibers 120 and may be distributed in the matrix 110. That is, some 130 of the inorganic additives may be attached to the cellulose nano fibers 120 and distributed in the matrix 110, and the other 131 of the inorganic additives may be distributed in the matrix 110 but is not attached to the cellulose nano fibers 120.

Such inorganic additives 130 and 131 may be uniformly distributed and located in the matrix 110. In this connection, the inorganic additives 130 and 131 being uniformly distributed may mean that a tendency of the aggregation of the inorganic additives 130 and 131 in the matrix 110 is low. That is, the tendency of the aggregation of the inorganic additives 130 and 131 is relatively lower than a tendency of dispersion of the inorganic additives 130 and 131.

The inorganic additive 130 attached to the cellulose nano fibers 120 and distributed in the matrix 110 may be surface-treated using a surface-treatment agent and thus may be attached to the cellulose nano fibers 120.

However, the inorganic additive 131 dispersed in the matrix 110 and not attached to the cellulose nano fibers 120 may also be surface-treated using a surface-treatment agent.

In other words, both inorganic additives 130 and 131 may be surface-treated. However, the inorganic additive 130 attached to the cellulose nano fibers 120 and dispersed in the matrix 110 and the inorganic additive 131 dispersed in the matrix 110 and not attached to cellulose nano fibers 120 may be present in a mixed manner probabilistically.

In this connection, the surface-treatment of the inorganic additives 130 and 131 may be performed using at least one of maleic acid and polydopamine.

The surface-treatment agent applied to the surface of the inorganic additive 130 may improve the affinity of the inorganic additive 130 to the cellulose nano fibers 120.

The inorganic additive 130 attached to the cellulose nano fibers 120 may be located in at least one position in the longitudinal direction of the cellulose nano fibers 120. That is, FIG. 1 shows that one inorganic additive 130 is attached to one location in the longitudinal direction of the cellulose nano fiber 120. However, this is only a schematic illustration. In practice, several inorganic additives 130 may be arranged along the length direction of the cellulose nano fiber 120 and may be attached thereto. Further, several cellulose nano fibers 120 may be attached to each other while the inorganic additive 130 may be attached thereto. This will be described in detail later.

Each of these inorganic additives 130 and 131 may have a spherical, ellipsoidal, or fibrous shape. In FIG. 1 and FIG. 2, each of the inorganic additives 130 and 131 is illustrated as having a spherical shape. However, the disclosure is not limited thereto. Each of the inorganic additives 130 and 131 may have an ellipsoidal shape. The shape of each of the inorganic additives 130 and 131 according to an embodiment of the present disclosure is not limited thereto.

For example, each of the inorganic additives 130 and 131 may include at least one of silica, fumed silica, fumed alumina, and metal carbonate.

A silica ($SiO_2$) particle is spherical. However, when the silica particle is fumed, the spherical silica particles agglomerate with each other such that a shape thereof changes to a tree branch, such that a network through which heat may easily spread may be formed.

Therefore, the inorganic additives 130 and 131 including a material such as fumed silica may improve the thermal stability of the secondary battery separator.

As mentioned above, the cellulose nano fibers 120 and 121 may be dispersed in the matrix 110.

The cellulose nano fibers 120 and 121 may be added to the support 100 to improve wettability thereof with an electrolyte in the secondary battery so that ions may be transferred quickly. That is, the electrolyte may quickly permeate into the support 100 and pass through the matrix 110.

Each of the cellulose nano fibers (CNF) 120 and 121 may be made of a crystalline polymer as a main component of a plant cell wall, and may have a diameter of 100 nm or smaller. These cellulose nano fibers 120 and 121 may exhibit high strength comparable to glass fiber and have a low coefficient of thermal expansion of 10 ppm/K or lower and thus have very good thermal stability.

According to an embodiment of the present disclosure, as described above, at least some 120 of the cellulose nano fibers 120 and 121 may be attached to the inorganic additive 130 and distributed in the matrix 110. That is, some 120 of the cellulose nano fibers may be distributed in the matrix 110 while being attached to the inorganic additive 130. The other 121 of the cellulose nano fibers 120 may be distributed in the matrix 110 while not being attached to the inorganic additive 130.

The matrix 110 and the inorganic additives 130 and 131 may be hydrophobic, but the cellulose nano fibers 120 and 121 may be hydrophilic. Thus, the former and the latter may not be mixed with each other well. Therefore, allowing at least one of the matrix 110 and the inorganic additives 130 and 131 to have hydrophilic properties or allowing the cellulose nano fibers 120 and 121 to have hydrophobicity may result in increase in the mechanical bonding force therebetween. In this connection, the cellulose nano fibers 120 and 121 may be advantageously and partially hydrophobic in view of the wettability thereof with the electrolyte as described above.

In this way, making the cellulose nano fibers 120 and 121 hydrophobic may allow the binding force thereof with at least one of the matrix 110 and the inorganic additives 130 and 131 to be increased.

That is, the cellulose nano fibers 120 and 121 may be surface-treated using a surface modifier. Thus, the cellulose nano fibers 120 and 121 may be at least partially hydrophobic.

The surface modifier of these cellulose nano fibers 120 and 121 may include at least one of maleic acid, polydopamine, carboxyl, acetate, phosphoric acid, sulfuric acid, amine, silane, succinic acid, and an alkyl compound.

In one example, the matrix 110 may be surface-treated using a surface-treatment agent. Thus, at least one of the cellulose nano fibers 120 and 121 and the matrix 110 may be surface-treated in order to improve a bonding strength between the cellulose nano fibers 120 and 121 and the matrix 110. That is, one of the cellulose nano fibers 120 and 121 and the matrix 110 may be surface-treated, or both the nano-cellulose fibers 120 and 121 and the matrix 110 may be surface-treated.

Further, in order to improve the bonding strength between the cellulose nano fibers 120 and 121 and the inorganic additives 130 and 131, at least one of the cellulose nano fibers 120 and 121 and the inorganic additives 130 and 131 may be surface-treated. That is, one of the cellulose nano fibers 120 and 121 and the inorganic additive 130 and 131 may be surface-treated, or both the cellulose nano fibers 120 and 121 and the inorganic additive 130 and 131 may be surface-treated.

The surface treatment of the matrix 110 may be performed using at least one of maleic acid and polydopamine. That is, the surface-treatment of the matrix 110 may be performed in the same way as the inorganic additives 130 and 131 may be surface-treated. However, the present disclosure is not limited thereto.

In one example, the matrix 110 may include a polyolefin-based material. In this connection, the polyolefin-based material may include polyethylene (PE) and polypropylene (PP). In some cases, a coating layer including inorganic particles may be located on at least one of the faces 111 and 112 of the matrix 110 (refer to FIG. 22).

Polypropylene (PP) may include ultra-high molecular weight polypropylene (UHMWPP). This ultra-high molecular polypropylene (UHMWPP) is a polyolefin-based material and has a molecular weight in a range of 500,000 to 1 million or higher.

This ultra-high molecular weight polypropylene (UHMWPP) has higher heat resistance compared to general polypropylene (PP) used in the secondary batteries, and also has abrasion resistance and high chemical resistance. Thus, the ultra-high molecular weight polypropylene (UHMWPP) may be used to realize the special properties required in the separator.

Therefore, when the matrix 110 of the secondary battery separator is made of the ultra-high molecular weight polypropylene (UHMWPP), the high-temperature heat shrinkage of the separator may be reduced.

In this way, the matrix 110 of the secondary battery separator is made of the ultra-high molecular weight polypropylene (UHMWPP), the heat resistance may be improved. Thus, the deformation may be lowered, such that the risk of explosion may be lowered, and thus stability may be secured.

In addition, a pore formation process and easiness thereof in the ultra-high molecular weight polypropylene (UHMWPP) may be substantially similar to those in the general polypropylene (PP) used in the secondary battery.

The polyethylene (PE) and polypropylene (PP) may respectively constitute network structures dispersed with each other. Herein, polypropylene (PP) may refer to the ultra-high molecular weight polypropylene (UHMWPP).

Figure 3:
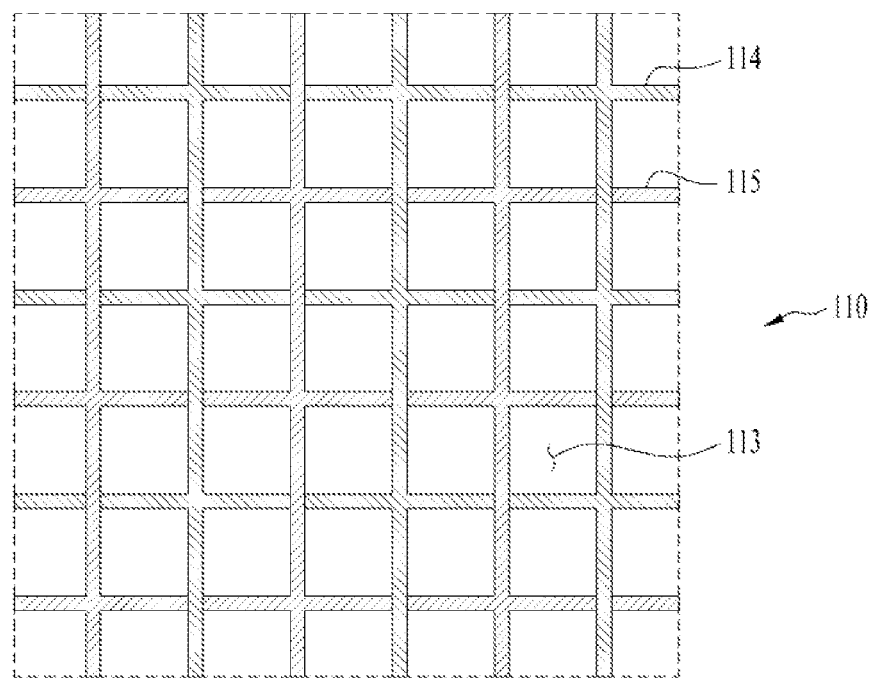
FIG. 3 is a schematic diagram showing a matrix of a separator structure according to one embodiment of the present disclosure.

FIG. 3 is a schematic diagram showing a matrix of the separator structure according to one embodiment of the present disclosure.

Referring to FIG. 3, as described above, polyethylene 114 and polypropylene 115 may respectively constitute the network structures dispersed with each other. In particular, polyethylene 114 and polypropylene 115 may respectively constitute network structures uniformly dispersed with each other.

Thus, polyethylene 114 and polypropylene 115 may respectively constitute the network structures uniformly dispersed and/or arranged with each other to reduce the thermal shrinkage of the separator occurring at a high temperature, for example, 150° C.

The pores 113 may be uniformly distributed in the network structures of polyethylene 114 and polypropylene 115.

The cellulose nano fibers 120 and 121 and the inorganic additive 130 and 131 as dispersed may be mixed with the matrix 110, or the matrix 110, the cellulose nano fibers 120 and 121 and the inorganic additive 130 and 131 (refer to FIG. 1 and FIG. 2) may be mixed with each other. Thus, the separator structure as described above may be fabricated.

Figure 4:
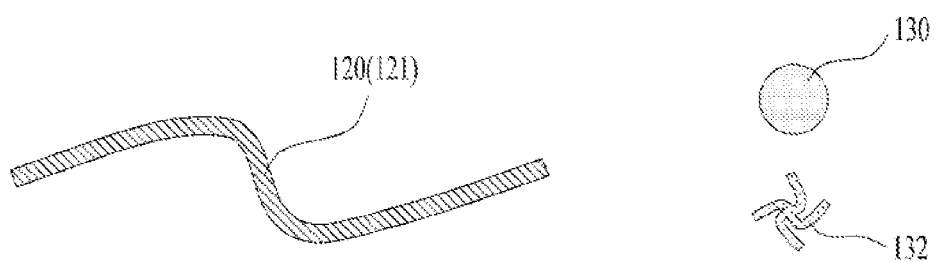
FIG. 4 to FIG. 6 are schematic diagrams showing a principle and a process of attachment between cellulose nano fibers and an inorganic additive of a separator structure according to one embodiment of the present disclosure.
Figure 5:
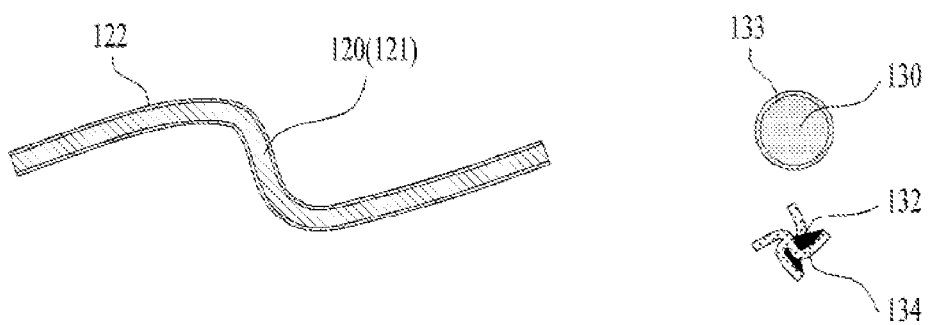
Figure 6:
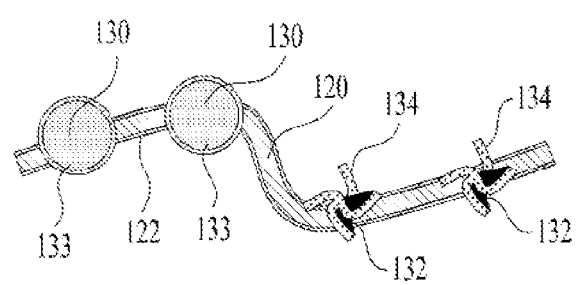

FIG. 4 to FIG. 6 are schematic diagrams showing a principle and a process of attachment between cellulose nano fibers and inorganic additives in the separator structure according to one embodiment of the present disclosure.

First, as shown in FIG. 4, the cellulose nano fibers 120 and the inorganic additives 130 and 132 may be produced separately. In this connection, the cellulose nano fibers 121 and the inorganic additive 131 as described above refer to entities that are not attached to each other and are located separately. Thus, the reference numbers thereof are omitted.

As described above, each of the inorganic additives 130 and 132 may have a spherical, ellipsoidal, or fibrous shape. FIG. 4 schematically shows the spherical inorganic additive 130 and the fibrous inorganic additive 132. FIG. 4 shows the spherical inorganic additive 130 and the fibrous inorganic additive 132 together. However, the disclosure is not limited thereto. It may be appreciated that only one of the inorganic additive 130 and the inorganic additive 132 may be used.

Then, as shown in FIG. 5, at least one of the cellulose nano fibers 120 and the inorganic additives 130 and 132 may be surface-treated.

For example, the cellulose nano fibers 120 may be surface-treated using a surface modifier 122. Thus, the cellulose nano fibers 120 may be at least partially hydrophobic.

The surface modifier 122 may be used to making the cellulose nano fibers 120 hydrophobic such that the binding force thereof to at least one of the matrix 110 and the inorganic additives 130 and 132 may be increased.

The surface modifier 122 of these cellulose nano fibers 120 may include at least one of maleic acid, polydopamine, carboxyl, acetate, phosphoric acid, sulfuric acid, amine, silane, succinic acid, and an alkyl compound.

In another example, the inorganic additives 130 and 132 may be surface-treated using surface-treatment agents 133 and 134, respectively.

In this connection, the surface-treatment of the inorganic additives 130 and 132 may be performed using at least one of maleic acid and polydopamine.

As described above, the surface-treatment agents 133 and 134 respectively applied to the surfaces of the inorganic additives 130 and 132 may improve the affinity of the inorganic additive 130 to the cellulose nano fibers 120.

Referring to FIG. 6, the surface-treated cellulose nano fibers 120 and the surface-treated inorganic additives 130 and 132 may be attached to each other.

The inorganic additives 130 and 132 attached to the cellulose nano fibers 120 may be located in at least one position in the longitudinal direction of the cellulose nano fibers 120.

FIG. 6 shows a state in which at least two spherical inorganic additives 130 and at least two fibrous inorganic additives 132 are attached to one cellulose nano fiber 120. Further, FIG. 6 shows a state in which all of the cellulose nano fibers 120, the spherical inorganic additive 130, and the fibrous inorganic additive 132 are surface-treated.

As mentioned above, each of the inorganic additives 130 and 132 may include at least one of silica, fumed silica, fumed alumina, or metal carbonate. In this connection, the fibrous inorganic additive 132 may include fumed silica or fumed alumina.

That is, spherical particles made of fumed silica or fumed alumina may be aggregated with each other to form a fibrous shape (tree branch shape). Thus, a network in which heat may be easily spread may be formed.

The inorganic additives 130 and 132 may be easily aggregated with each other, whereas the inorganic additives 130 and 132 attached to the cellulose nano fibers 120 may be dispersed in the matrix 110 due to the properties of the cellulose nano fibers 120.

Figure 7:
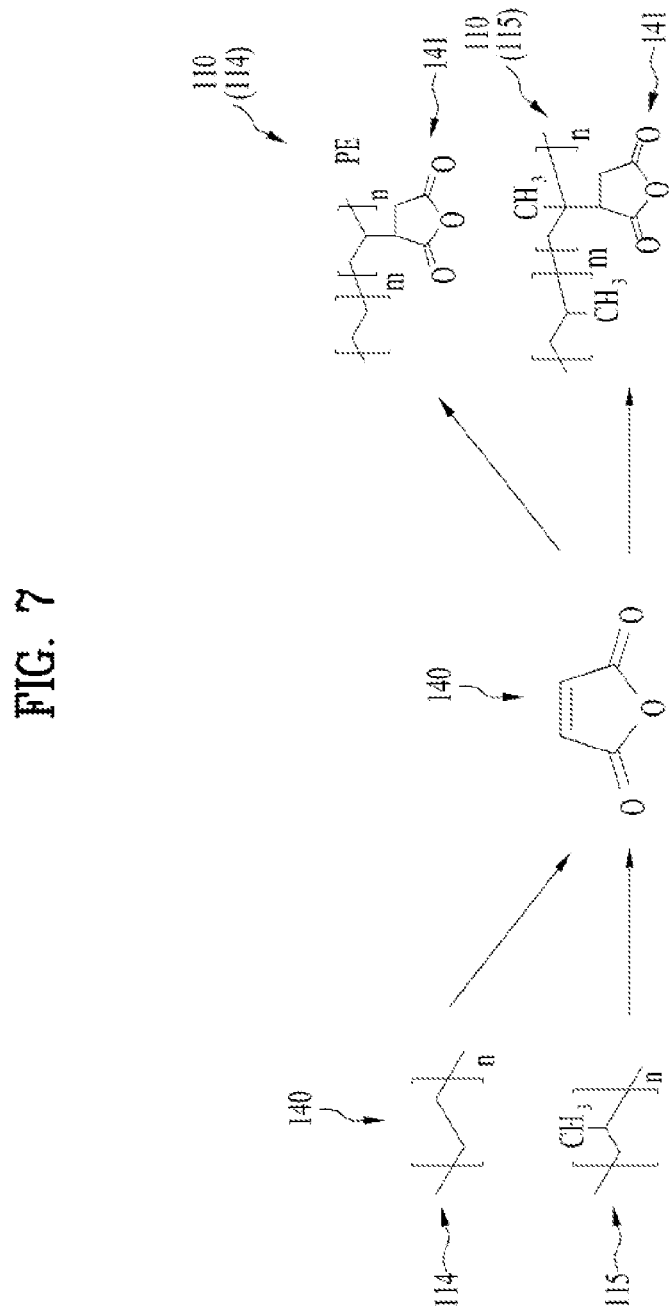
FIG. 7 is a chemical structural formula showing a process of surface-treatment of a matrix of a separator structure according to one embodiment of the present disclosure.

FIG. 7 is a chemical structural formula showing a process of surface-treatment of the matrix of the separator structure according to one embodiment of the present disclosure.

Referring to FIG. 7, the surface-treatment process of polyethylene 114 and polypropylene 115 included in the matrix 110 using maleic acid 140 is shown.

When polyethylene 114 and polypropylene 115 are added to molten maleic acid 140 and reaction therebetween occurs, the matrix 110 as surface-treated with the maleic acid is prepared. That is, under the surface-treatment using the maleic acid 140, the matrix 110 including hydrophobic polyethylene 114 and polypropylene 115 may be combined with maleic acid 141 in which a pentagonal ring is in a transitioned state.

Figure 8:
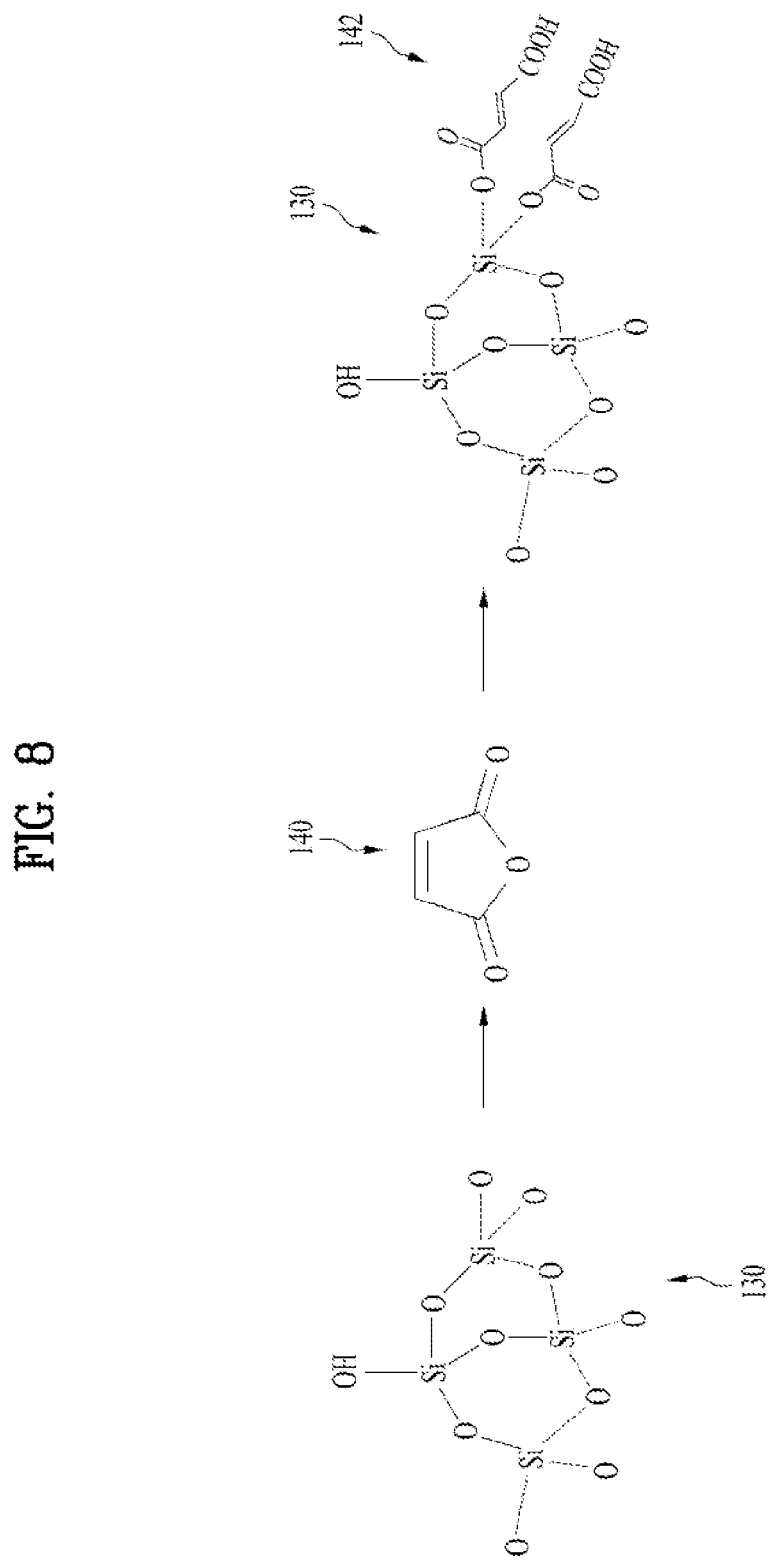
FIG. 8 is a chemical structural formula showing a process of surface-treatment of an inorganic additive of a separator structure according to one embodiment of the present disclosure.

FIG. 8 is a chemical structural formula showing a process of surface-treatment of the inorganic additive of the separator structure according to one embodiment of the present disclosure.

Referring to FIG. 8, the process of surface-treatment of silica particles 130 as an example of an inorganic additive using maleic acid 140 is shown.

When silica particles 130 are added to maleic acid 140 and reaction therebetween occurs, the inorganic additive 130 surface-treated with maleic acid is produced. That is, the hydrophobic silica particles 130 may be combined with the maleic acid 142 in which the pentagonal ring is in an open state under the surface-treatment of the maleic acid 140.

Figure 9:
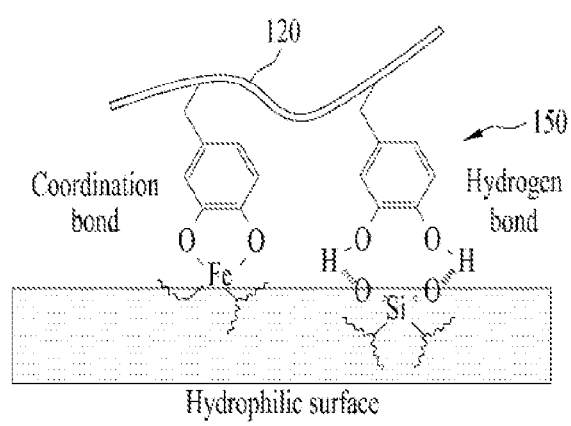
FIG. 9 and FIG. 10 are chemical structural formulas showing surface-treated cellulose nano fibers of a separator structure according to one embodiment of the present disclosure.
Figure 10:
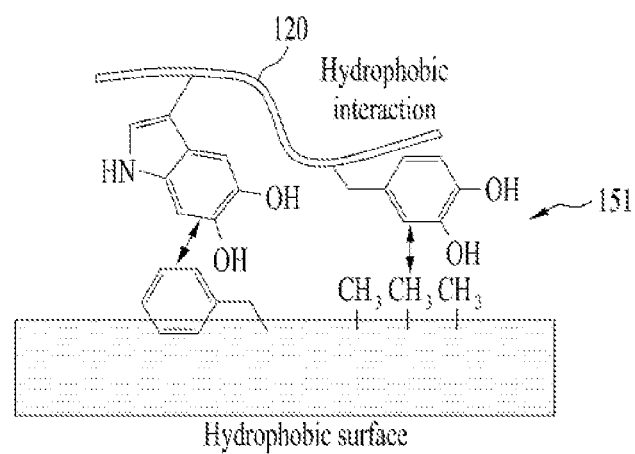

FIG. 9 and FIG. 10 are chemical structural formulas showing a surface-treated cellulose nano fiber of the separator structure according to one embodiment of the present disclosure.

As described above, the cellulose nano fibers 120 may be at least partially hydrophobized.

Making the cellulose nano fibers 120 and 121 hydrophobic may allow the mechanical bonding force therebetween to be increased. In this connection, it may be advantageous for the cellulose nano fibers 120 and 121 to be at least partially hydrophobic in view of wettability thereof to the electrolyte as described above.

Thus, making the cellulose nano fibers 120 and 121 at least partially hydrophobic may allow the binding force thereof with at least one of the matrix 110 and the inorganic additives 130 and 131 to be increased.

The surface modifier of the cellulose nano fibers 120 and 121 may include at least one of maleic acid, polydopamine, carboxyl, acetate, phosphoric acid, sulfuric acid, amine, silane, succinic acid, and an alkyl compound.

In an example, polydopamine may be used as a surface modifier of these cellulose nano fibers 120.

FIG. 9 shows a state in which the cellulose nano fibers 120 and the hydrophilic surface are combined with each other via polydopamine. FIG. 10 shows a state in which the cellulose nano fibers 120 and the hydrophobic surface are combined with each other via polydopamine.

When a material is surface-treated with maleic acid and polydopamine, a bond of a pentagonal ring of the maleic acid is broken and the maleic acid is coupled to the material.

Polydopamine has hydrophobic pentagonal and hexagonal rings and a hydrophilic hydroxyl group (—OH), so that the ring binds to the hydrophobic surface under van der Waals attraction, and the hydroxyl group binds to the hydrophilic material such that the hydrophilic material is coupled to the hydrophobic material.

Thus, when using polydopamine, the cellulose nano fiber 120 is bonded to the hydrophilic surface via an O—H (hydroxyl group) hydrogen bond (FIG. 9). Due to polydopamine, the cellulose nano fibers 120 may be bound to the hydrophobic surface and the hexagonal ring via van der Waals attraction.

That is, the cellulose nano fibers 120 may be combined with the matrix 110 having a hydrophobic surface and the inorganic additive 130 via polydopamine as a surface modifier.

Figure 11:
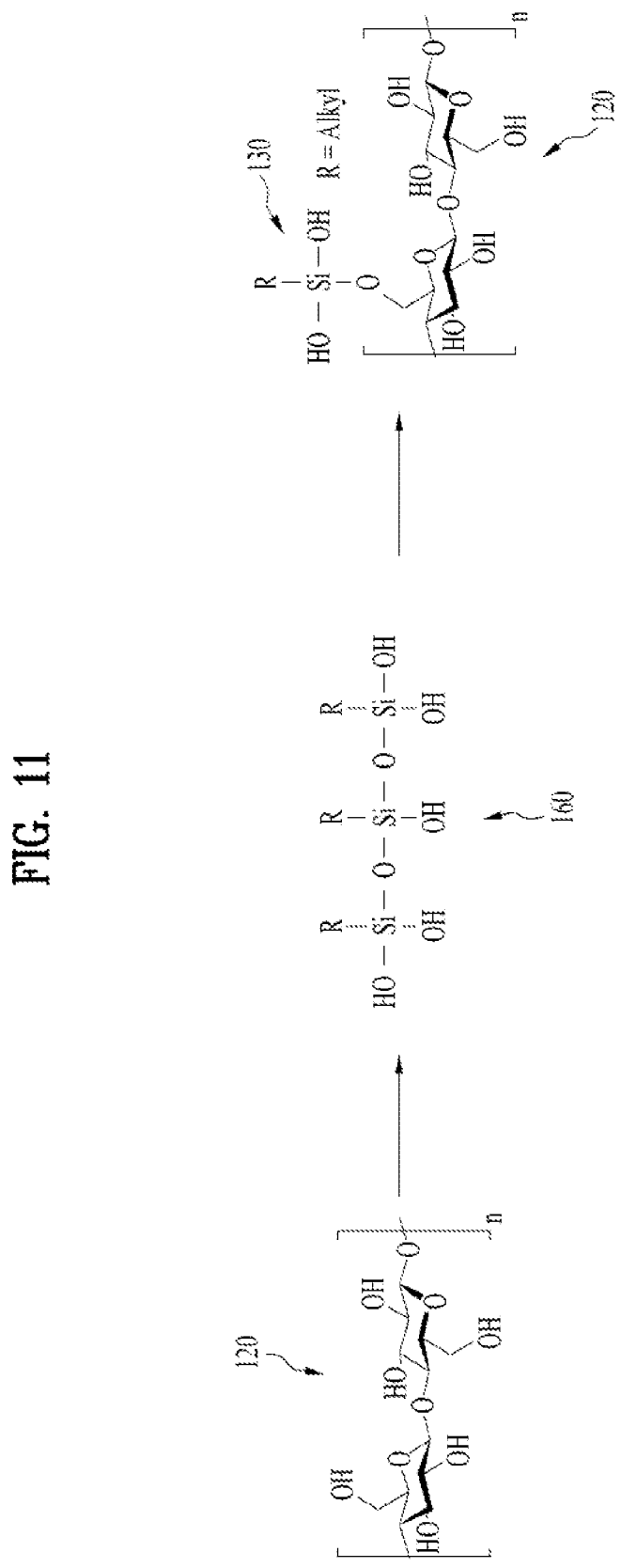
FIG. 11 is a chemical structural formula showing a process of producing cellulose nano fibers to which an inorganic additive is attached in a separator structure according to one embodiment of the present disclosure.

FIG. 11 is a chemical structural formula showing a process of producing cellulose nano fibers to which the inorganic additive is attached in the separator structure according to one embodiment of the present disclosure.

Referring to FIG. 11, the cellulose nano fibers 120 may be produced in a state in which the inorganic additive 130 is attached thereto via silane treatment.

The cellulose nano fibers 120 to which the inorganic additive 130 is attached may be produced using the method as described above with reference to FIGS. 4 to 6. However, the disclosure is not limited thereto. As described herein, in another example, the nano cellulose fibers 120 to which a silane inorganic additive 130 is attached may be fabricated using the silane treatment process.

This process may be accomplished by adding a silane compound 160 to the pulp as a material of the cellulose nano fibers 120, and performing reaction therebetween, followed by pulverization. In some cases, a pulverization process may occur before the reaction process. Afterwards, optionally, a drying process may be carried out. This process will be described later in detail.

Referring to FIG. 11, the cellulose nano fibers 120 to which silane 160 including an alkyl compound as the inorganic additive 130 is attached may be produced using this silane treatment. That is, this process may not require adding a separate inorganic additive 130 in order to produce the cellulose nano fibers 120 to which the inorganic additive 130 is attached.

Figure 12:
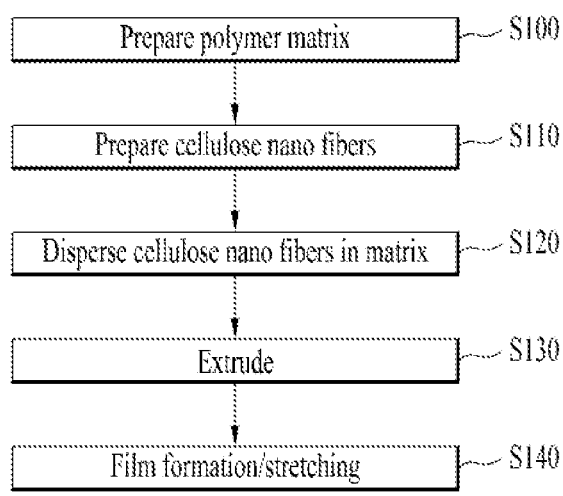
FIG. 12 is a flowchart showing a producing process of a separator structure according to one embodiment of the present disclosure.
Figure 13:
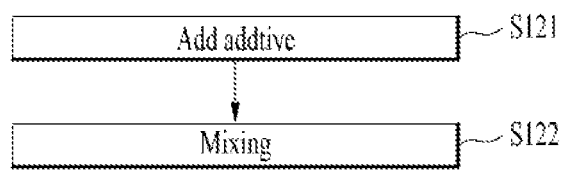
FIG. 13 is a flowchart showing a production process of a separator structure via powder mixing according to one embodiment of the present disclosure.
Figure 14:
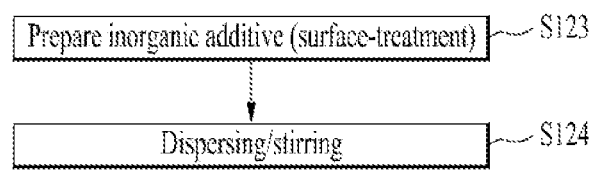
FIG. 14 is a flowchart showing a production process of a separator structure via liquid mixing according to one embodiment of the present disclosure.

FIG. 12 is a flowchart showing a producing process of the separator structure according to one embodiment of the present disclosure. FIG. 13 is a flowchart showing a production process of the separator structure using powder mixing according to one embodiment of the present disclosure. FIG. 14 is a flowchart showing a producing process of the separator structure using liquid mixing according to one embodiment of the present disclosure.

Hereinafter, with reference to FIG. 12 to FIG. 14, the producing process of the separator structure according to one embodiment of the present disclosure will be described. In this connection, descriptions will be made with referring to FIG. 1.

Referring to FIG. 12, the method for producing the separator according to one embodiment of the present disclosure may include a step S100 of preparing the porous polymer matrix 110, a step S110 of preparing the cellulose nano fibers 120, a step S120 of dispersing the inorganic additives 130 and the cellulose nano fibers 120 in the matrix 110, and a step S130 of extruding the matrix 110, the cellulose nano fibers 120, and the inorganic additive 130.

In this connection, the step S100 of preparing the porous polymer matrix 110 and the step S110 of preparing the cellulose nano fibers 120 may be performed in a different order from that in the above description. That is, unlike shown in FIG. 12, the step S110 of preparing the cellulose nano fibers 120 may be performed first.

A mixture material extruded in the extruding step S130 may be pelletized and pores may be formed therein in a stretching process in S140.

Hereinafter, each of the steps of the separator producing method according to one embodiment of the present disclosure will be described in detail.

First, the porous polymer matrix 110 may be produced in S100. This matrix 110 may be produced using a polyolefin-based material.

The polyolefin-based material may include polyethylene (PE) and polypropylene (PP). For example, polyethylene (PE) and polypropylene (PP) polymer may be used independently or may be mixed with other to produce the polymer matrix 110.

In this connection, polypropylene (PP) may include ultra-high molecular weight polypropylene (UHMWPP). In addition, a pore formation process and easiness thereof in the ultra-high molecular weight polypropylene (UHMWPP) may be substantially similar to those in the general polypropylene (PP) used in the secondary battery.

When producing the matrix 110 in this way, polyethylene (PE) and polypropylene (PP) may respectively constitute network structures dispersed with each other.

In one example, the matrix 110 may be surface-treated using a surface-treatment agent. Thus, at least one of the cellulose nano fibers 120 and 121 and the matrix 110 may be surface-treated in order to improve the bonding strength between the cellulose nano fibers 120 and 121 and the matrix 110.

The surface treatment of the matrix 110 may be performed using at least one of maleic acid and polydopamine. Specifically, a polymer including polyethylene (PE) and polypropylene (PP) may be added to an aqueous solution in which at least one of maleic acid and polydopamine is dissolved, and the mixed solution is stirred at room temperature and then is dried. In this way, hydrophilic surface-treated polymer matrix 110 may be produced.

Next, the cellulose nano fibers (CNF) 120 may be produced in S110.

In this connection, as described above, the process S100 for producing the porous polymer matrix 110 and the process S110 for producing the cellulose nano fibers 120 may be performed independently. That is, the process S110 of producing the cellulose nano fibers 120 may be performed before or independently of the process S100 of producing the porous polymer matrix 110.

The production of the cellulose nano fibers 120 may be accomplished by pulverizing biomass raw materials, and refining the pulverizing result to form fibers with a diameter of several to several hundred nm.

In a specific example, the production of the cellulose nano fibers 120 may be achieved using a method including following process.

First, raw materials may be input. This process may be a process of adding the pulp to a solvent, for example, water and stirring the mixture. The raw material of the pulp may include bamboo, softwood, and hardwood pulps. In an example, the hardwood pulp may be used.

The pulp may then be dispersed. In this connection, refining, beating or mixers may be used to increase a surface area of the pulp so that the pulp may react with ions.

Thereafter, the binding force of the cellulose nano fibers 120 with at least one of the matrix 110 and the inorganic additive 130 may be increased by performing the surface-treatment of the cellulose nano fibers 120 to have hydrophobicity.

That is, the cellulose nano fibers 120 may be surface-treated using a surface modifier. Thus, the cellulose nano fibers 120 may be at least partially hydrophobic.

The cellulose nano fiber 120 may include hydroxyl groups (—OH). The surface having the hydroxyl groups may be treated using at least one of maleic acid, polydopamine, carboxyl, acetate, phosphoric acid, sulfuric acid, amine, silane, succinic acid, and alkyl compound.

That is, the hydroxyl group —OH on the surface of the cellulose nano fibers 120 reacts with the hydroxyl group of the surface modifier such that water $H_2O$ is discharged out thereof and thus a bond between the two materials is formed.

Thereafter, the cellulose nano fibers 120 as surface-treated using a surface modifier may be produced using washing and pulverization processes.

Next, the process S120 of dispersing the inorganic additives 130 and the cellulose nano fibers 120 in the matrix 110 may be performed.

The process S120 of dispersing the inorganic additives 130 and the cellulose nano fibers 120 in the matrix 110 may be performed using a powder mixing scheme as shown in FIG. 13 or a liquid mixing scheme as shown in FIG. 14.

First, the powder mixing scheme as shown in FIG. 13 will be described.

That is, the process S120 of dispersing inorganic additive 130 and the cellulose nano fibers 120 in the matrix 110 may be performed by mixing the matrix 110, the cellulose nano fibers 120, the organic additive, and the inorganic additive 130 with each other in a powder state.

In this process, at least a portion of the organic additive may modify the surface of the inorganic additive 130. Therefore, the surface-treated inorganic additive 130 may be attached to the cellulose nano fibers 120 via this mixing process.

That is, the surface-treatment of the inorganic additive 130 may improve the affinity of the inorganic additive 130 to the cellulose nano fibers 120.

Hereinafter, a specific example of the powder mixing scheme will be described.

First, the organic additive and the inorganic additive 130 are added in S121. The organic additive and the inorganic additive 130 are mixed with the cellulose nano fibers 120 and the matrix 110 in S122.

In this connection, the organic additive may be at least one of maleic acid and polydopamine used for surface-treatment of the inorganic additive 130.

In some cases, when any one of the matrix 110 and the cellulose nano fibers 120 is not surface-treated in the above process, the organic additive may include an additive for surface-treatment of any one of these matrix 110 and the cellulose nano fibers 120.

Further, the inorganic additive 130 may include at least one of silica, fumed silica, fumed alumina, or metal carbonate.

Next, the liquid mixing scheme as shown in FIG. 14 will be described.

The process S120 of dispersing inorganic additive 130 and the cellulose nano fibers 120 in the matrix 110 may be performed by mixing the matrix 110, the cellulose nano fibers 120, the organic additive, and the inorganic additive 130 with a solvent.

That is, the process S120 of dispersing the inorganic additive 130 and the cellulose nano fibers 120 in the matrix 110 may include a step S123 of performing surface-treatment of the inorganic additive 130, and a step 124 of dispersing and/or stirring the matrix 110, the cellulose nano fibers 120, and the surface-treated inorganic additive 130 in the solvent.

In this connection, the solvent may be an aqueous solvent or an oil-based solvent. That is, the dispersion process may be classified into an aqueous dispersion process and an oil-based dispersion process.

For example, when the matrix 110 and the inorganic additive 130 have been subjected to hydrophilic surface-treatment, they may be dispersed and stirred in an aqueous solvent using a super-mixer, millstone grinder, high pressure homogenizer, waterjet ejector, etc. Thereafter, the solvent may be removed using a filtering process.

In another example, when the matrix 110, the cellulose nano fibers 120, and the inorganic additive 130 are hydrophobized via the surface-treatment, they may be dispersed and stirred using a super-mixer, millstone grinder, high pressure homogenizer, waterjet ejector, etc. on the wax as an organic additive. Thereafter, the wax may be removed if necessary.

Referring back to FIG. 12, the mixed raw materials, that is, the mixture of the matrix 110, the cellulose nano fibers 120, and the inorganic additive 130 may be extruded using an extruder to form pellets in S130.

Next, the pellets are formed into a film form using a filming-making apparatus such as a T-die or a hot press, and then, pores may be formed via the stretching process in S140.

In this process, the separator for the secondary battery may be produced.

Figure 15:
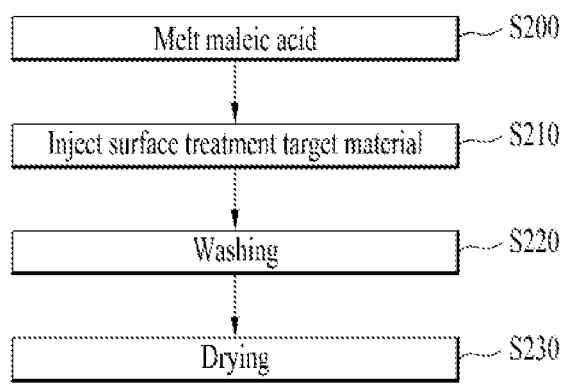
FIG. 15 is a flowchart showing a surface-treatment process using maleic acid in a method of producing a separator structure according to one embodiment of the present disclosure.

FIG. 15 is a flowchart showing the surface-treatment process using maleic acid in a method of producing a separator structure according to one embodiment of the present disclosure.

As described above, at least any one of the matrix 110, the cellulose nano fibers 120, and the inorganic additive 130 may be surface-treated using maleic acid.

Hereinafter, referring to FIG. 15, the surface-treatment process using maleic acid will be described.

First, the maleic acid may be melted via heating (for example, about 55° C.) in S200.

Thereafter, surface-treatment target materials such as the matrix 110, the cellulose nano fibers 120, and the inorganic additive 130 may be added to the molten maleic acid and then reaction therebetween may occur in S210.

Next, the method may include filtering a reaction product from the above reaction process and washing unreacted materials using excessive water to neutralize the pH in S220.

Then, the filtered and washed reaction product may be dried via heating in S230. The heating may be accomplished in an oven.

Figure 16:
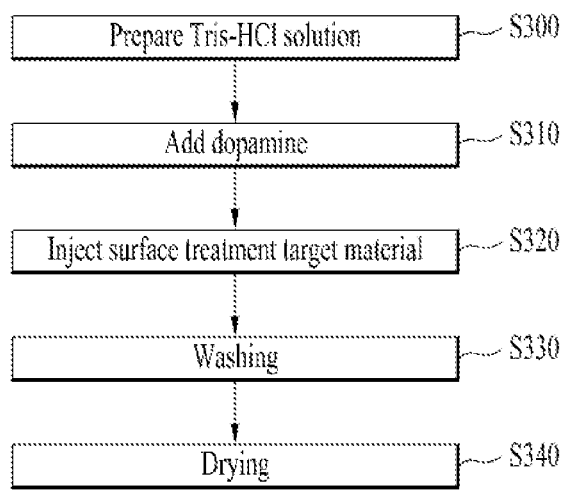
FIG. 16 is a flowchart showing a surface-treatment process using polydopamine in a method of producing a separator structure according to one embodiment of the present disclosure.

FIG. 16 is a flowchart showing the surface-treatment process using polydopamine in a method of producing a separator structure according to one embodiment of the present disclosure.

As described above, at least any one of the matrix 110, the cellulose nano fibers 120, and the inorganic additive 130 may be surface-treated using polydopamine.

Hereinafter, referring to FIG. 16, the surface-treatment process using polydopamine is described.

First, Tris-HCl is diluted in water to a certain concentration, for example, 10 mM. Then, pH thereof is adjusted using a NaOH solution (in one example, pH=8.5) in S300.

Thereafter, dopamine may be added to the Tris-HCl solution and stirring may be started in S310. This stirring process may be performed at room temperature.

Next, the surface-treatment may be performed by adding the surface-treatment target materials such as the matrix 110, the cellulose nano fibers 120, and the inorganic additive 130 to the Tris-HCl solution to which dopamine is added and then carrying out reaction therebetween in S320.

Thereafter, when the reaction has been completed, the reaction product changes to dark gray. The product may be filtered and the unreacted material may be washed with excessive water in S330.

Then, the filtered and washed reaction product may be dried via heating in S340. The heating of the reaction product may be accomplished in an oven.

Figure 17:
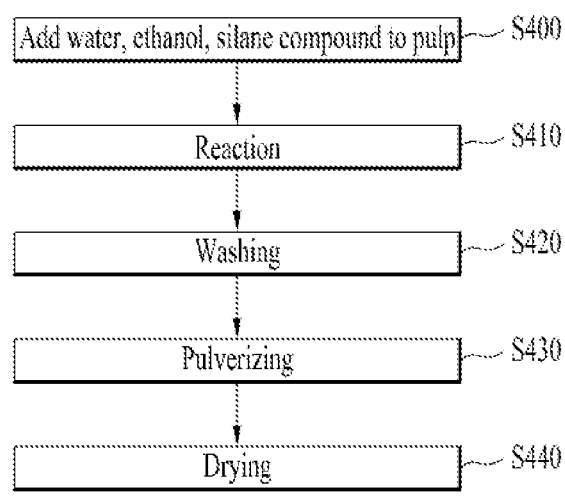
FIG. 17 is a flowchart showing a process of producing an inorganic additive attached to cellulose nano fibers using a silane treatment process in a method of producing a separator structure according to one embodiment of the present disclosure.

FIG. 17 is a flowchart showing the process of preparing inorganic additives attached to cellulose nano fibers using a silane treatment process in a method of producing a separator structure according to one embodiment of the present disclosure.

The nano cellulose fibers 120 to which the inorganic additive 130 is attached may be produced using silane treatment.

This process may be accomplished by adding a silane compound 160 to the pulp as a material for the cellulose nano fibers 120, and reacting the compound and the pulp with each other, followed by pulverization. In some cases, the pulverization process may occur before the reaction. Afterwards, optionally, a drying process may be executed.

Hereinafter, referring to FIG. 17, the process of adding the silane compound, reacting the mixture, and pulverizing the reaction product will be described.

First, water, ethanol, and a silane compound may be added to the pulp as a material for the cellulose nano fibers 120 in S400.

Thereafter, the pulp, water, ethanol, and silane compound may react with each other in S410. In this connection, the stirring process may be done together.

After the reaction has been completed, the reaction product and unreacted materials may be washed in S420.

Next, the reaction product may be pulverized in S430. In this connection, the pulverization process may be performed using equipment such as a millstone grinder, high pressure homogenizer, and aqueous counter collision system.

Thereafter, a drying process 440 may optionally be performed.

Figure 18:
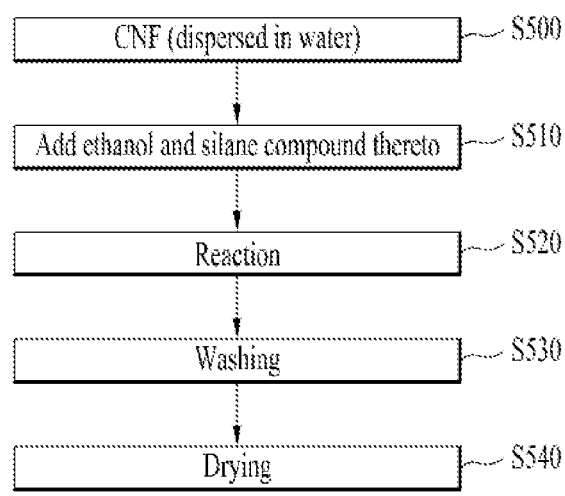
FIG. 18 is a flowchart showing a process of producing an inorganic additive attached to the cellulose nano fibers using a silane treatment process in a method for producing a separator structure according to another embodiment of the present disclosure.

FIG. 18 is a flowchart showing a process of preparing the inorganic additive attached to the cellulose nano fibers using the silane treatment process in a method for producing the separator structure according to another embodiment of the present disclosure.

Hereinafter, referring to FIG. 18, a process of executing the pulverization, then, adding a silane compound and then reacting the mixture is described.

First, the cellulose nano fibers (CNF) 120 may be produced in S500. The production of the cellulose nano fibers 120 may be accomplished using the process described above. Further, the cellulose nano fibers 120 may be in a dispersed state in water.

Next, ethanol and the silane compound may be added to the cellulose nano fibers 120 in S510.

Then, the cellulose nano fibers 120, water, ethanol, and the silane compound may react with each other in S520. In this connection, the stirring process may be done together.

After the reaction has been completed, the reaction product and the unreacted materials may be washed in S530.

Thereafter, a drying process 540 may optionally be performed.

Figure 19:
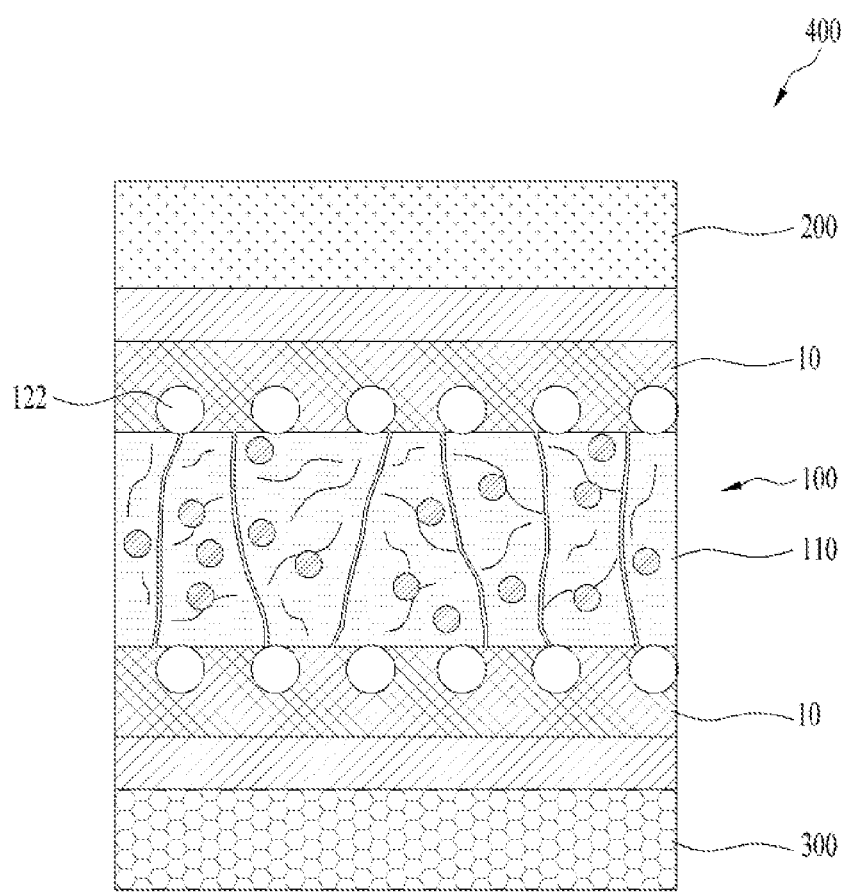
FIG. 19 is an image showing aggregation of inorganic silica particles according to a comparative example compared to the present disclosure.

FIG. 19 is a photograph showing the aggregation of the inorganic silica particles in a comparative example compared to the present disclosure.

As described above, the inorganic additive 130 dispersed in the matrix 110 has great thermal stability, thereby preventing the shrinkage of the polymer matrix 110. However, because the inorganic additive 130 itself may be locally aggregated, the inorganic additive particles may not be uniformly distributed in the matrix 110.

For example, silica particles as one example of the inorganic additive particles 130 may be aggregated when the silica particles are sufficiently dispersed in water to form a film. That is, referring to FIG. 19, the silica particles are aggregated (white portion). The aggregation size may be about tens of nanometers.

Figure 20:
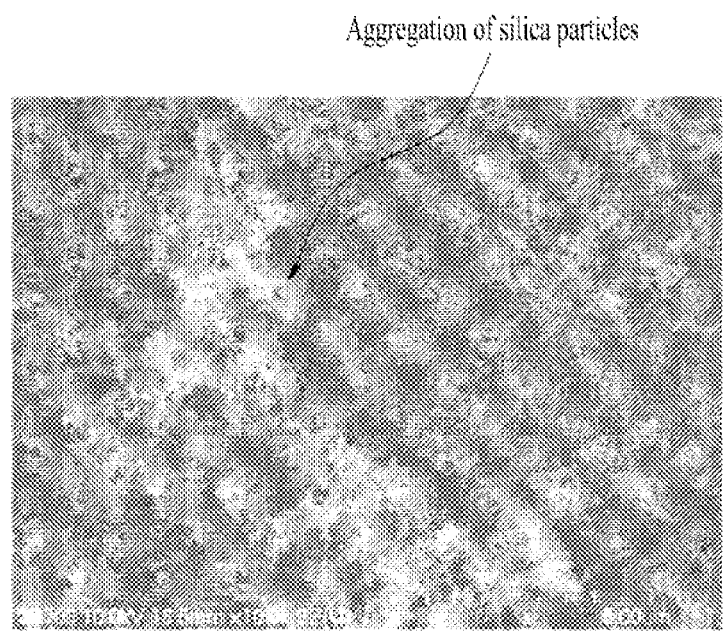
FIG. 20 is a photograph showing an inorganic additive attached to dispersed cellulose nano fibers of the separator structure according to one embodiment of the present disclosure.

FIG. 20 is a photograph showing the inorganic additive attached to the dispersed cellulose nano fibers in the separator structure according to one embodiment of the present disclosure. Further, FIG. 21 is an enlarged picture of a portion A of FIG. 20.

Figure 21:
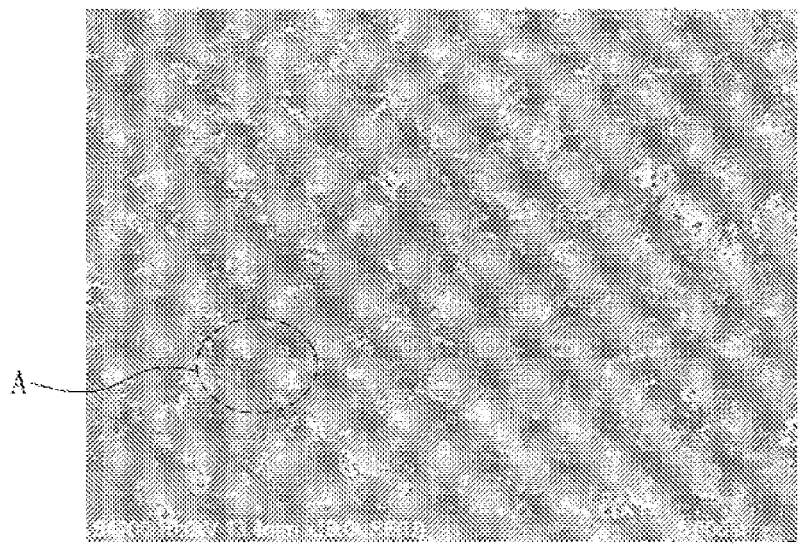
FIG. 21 is an enlarged picture of a portion A of FIG. 20.

Referring to FIG. 20 and FIG. 21, at least some of silica particles as one example of the inorganic additive particles 130 are attached to the cellulose nano fibers 120 and are dispersed. In an example, FIG. 20 and FIG. 21 show a state in which the silica particles and the cellulose nano fibers 120 together are dispersed to form a film.

FIG. 20 shows a photograph of the same scale as that of FIG. 19. However, referring to FIG. 20, it may be identified that the silica particles are substantially uniformly dispersed, compared to those in FIG. 19. Further, referring to FIG. 21, it may be identified that silica particles are attached to the cellulose nano fibers and are dispersed.

Thus, according to an embodiment of the present disclosure, at least some of the inorganic additives 130 may be attached to the cellulose nano fibers 120 and distributed in the matrix 110. Further, some of the inorganic additives 130 may be distributed in the matrix 110 while not being attached to the cellulose nano fibers 120.

For example, when the cellulose nano fibers 120 are used, the inorganic additive 130 may bind onto a surface of the cellulose nano fibers 120, or the cellulose nano fibers 120 may act as a so-called spacer that prevents the mutual aggregation of the inorganic additives 130, thereby improving the dispersibility.

As described above, according to the embodiment of the present disclosure, when the matrix of the secondary battery separator is fabricated using a ultra-high molecular weight polypropylene (UHMWPP), the matrix may reduce the high-temperature heat shrinkage of the separator.

When the matrix of the secondary battery separator is fabricated using a ultra-high molecular weight polypropylene (UHMWPP), heat resistance is improved. Thus, the deformation may be lowered and the risk of explosion may be lowered, so that stability may be secured.

The inorganic additives including the material such as the fumed silica may improve the thermal stability of the secondary battery separator.

The nano cellulose fibers may be added into the support to improve the wettability thereof with the electrolyte in the secondary battery so that ions may be transferred quickly.

The surface-treated cellulose nano fibers and the inorganic additives may constitute the composite to improve the binding force thereof with the polyolefin-based polymer matrix, and to improve the dispersion of the inorganic additive to improve the heat resistance of the secondary battery separator.

Depending on the type of the surface-treatment of the cellulose nano fibers, the cellulose nano fibers and various polymers may constitute various composites. Further, the mechanical strength, porosity, and heat resistance of the secondary battery separator may be controlled by controlling the diameter, length, and content.

Figure 22:
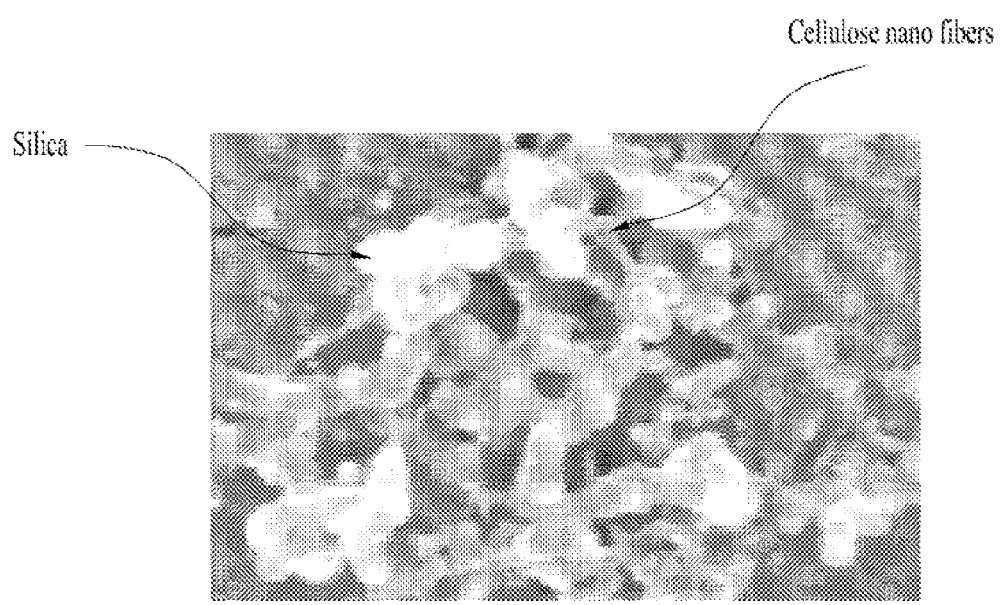
FIG. 22 is a cross-sectional schematic diagram showing a secondary battery including a separator structure according to one embodiment of the present disclosure.

FIG. 22 is a cross-sectional schematic diagram showing a secondary battery including a separator structure according to one embodiment of the present disclosure.

Referring to FIG. 22, a structure of a secondary battery 400 is schematically shown. The secondary battery 400 may include a positive electrode 200, a negative electrode 300, a separator 100 located between the positive electrode 200 and the negative electrode 300, an electrolyte 10 located between the positive electrode 200 and the separator 100 and between the negative electrode 300 and the separator 100. In this connection, the electrolyte 10 may include either a liquid electrolyte or a solid electrolyte.

As described above, the separator 100 may include the porous matrix 110 including the first face 111 and the second face 112, the cellulose nano fibers 120 and 121 dispersed in the matrix 110, and the inorganic additives 130 and 131 dispersed in the matrix 110 (See FIG. 1).

The matrix 110 may be embodied as a porous film made of a polyolefin (PO)-based polymer resin such as polyethylene (PE) or polypropylene (PP) alone or in a mixed manner.

When the matrix 110 is exposed to a high temperature of about 120° C. or higher, the pores thereof may be closed to prevent the explosion of the battery. This may be referred to as a shut-down function.

The inorganic additives 130 dispersed in the matrix 110 has great heat stability, thereby preventing the shrinkage of the polymer matrix 110.

In this connection, the inorganic additive 130 may bind onto a surface of the cellulose nano fibers 120, or the cellulose nano fibers 120 may act as a so-called spacer that prevents the mutual aggregation of the inorganic additives 130, thereby improving the dispersibility.

Thus, the secondary battery 400 may be composed of the electrodes 200 and 300, the separator 100, and the electrolyte 10. The positive electrode 200, the separator 100, and the negative electrode 300 may be stacked in the number corresponding to the capacity of the cell in an order of the positive electrode 200, the separator 100, and the negative electrode 300.

The secondary battery may be produced in a pouch shape or a cylindrical shape depending on a cell type, and may be produced by performing cell assembly and then electrolyte injection.

For example, the positive electrode 200 may be made of aluminum, and the negative electrode 300 may be made of copper. In this case, the positive electrode 200 may be produced by coating a positive electrode active material slurry on aluminum, and the negative electrode 300 may be produced by coating a negative electrode active material slurry on a copper-foil metal current collector.

Specifically, the positive electrode active material slurry may be produced by mixing the active material in a powder form, PVDF binder, and a conductive material with NMP solvent.

The negative electrode active material slurry may be produced using a binder, NMP solvent, and artificial graphite, or may be produced using natural graphite, water as a solvent, a water-based binder, and surfactant.

The electrolyte may be composed of a lithium salt, a solvent, and an additive. In this connection, the lithium salt may include $LiPF_6$, $LiBF_4$, $LiAsF_6$, $LiClO_4$, $LiCF_3SO_3$, etc. The solvent may employ EC (Ethylene Carbonate), PC (Propylene Carbonate), DCM (Dimethyl Carbonate), DEC (Dimethyl Carbonate), ECM (Ethylmethyl Carbonate), etc. alone or in a mixed manner.

The secondary battery may have the technical effects as described above. That is, high temperature durability of the secondary battery may be secured, and mechanical strength thereof may be improved. The duplicate description thereof is omitted.

The above description is merely an exemplary description of the technical idea of the present disclosure. The person having ordinary knowledge in the technical field to which the present disclosure belongs may make various modifications and variations without departing from the essential characteristics of the present disclosure.

Therefore, the embodiments disclosed in the present disclosure may not limit the technical idea of the present disclosure, and the scope of the technical idea of the present disclosure is not limited to this embodiment.

The scope of protection of the present disclosure should be interpreted by the claims below, and all technical ideas within the scope equivalent thereto should be construed as being included in the scope of the present disclosure.

What is claimed is:

1. A separator structure including a support disposed inside a secondary battery, wherein the support comprises:
   a surface-treated porous polymer matrix with a surface treatment agent, wherein the surface-treatment agent includes at least one of maleic acid or polydopamine;
   at least partially hydrophobized cellulose nano fibers with a surface modifier,
   wherein the surface modifier includes at least one of maleic acid, polydopamine, carboxyl, acetate, phosphoric acid, sulfuric acid, amine, silane, succinic acid, or an alkyl compound; and
   surface-treated inorganic additives with a surface-treatment agent, wherein the surface-treatment agent comprises at least one of maleic acid or polydopamine,
   wherein the cellulose nano fibers and the inorganic additives are dispersed in the matrix, and
   wherein at least some of the inorganic additives dispersed in the matrix are attached to a respective fiber, among the cellulose nano fibers, and
   wherein the cellulose nano fibers have a diameter of 100 nm or smaller.

2. The separator structure of claim 1, wherein the surface-treatment agent enhances affinity of the at least some inorganic additives to the cellulose nano fibers.

3. The separator structure of claim 1, wherein at least some inorganic additives are located at least one position in a longitudinal direction of a respective fiber from among the cellulose nano fibers.

4. The separator structure of claim 1, wherein each of at least some of the inorganic additives have a spherical, ellipsoidal, or fibrous shape.

5. The separator structure of claim 1, wherein each of at least some of the inorganic additives include at least one of silica, fumed silica, fumed alumina, or metal carbonate.

6. The separator structure of claim 1, wherein the surface modifier enhances a bonding force between the matrix and the cellulose nano fibers.

7. The separator structure of claim 1, wherein the matrix includes polyethylene and ultra-high molecular weight polypropylene (UHMWPP).

8. The separator structure of claim 7, wherein the polyethylene and the ultra-high molecular weight polypropylene (UHMWPP) respectively constitute network structures dispersed with each other.

9. A secondary battery comprising:
   a positive electrode;
   a negative electrode;
   a separator including a porous support positioned between the positive and negative electrodes; and
   electrolyte located between the positive electrode and the separator and between the negative electrode and the separator,
   wherein the support includes:
   a surface-treated porous polymer matrix with a surface-treatment agent, wherein the surface-treatment agent includes at least one of maleic acid or polydopamine;
   at least partially hydrophobized cellulose nano fibers with a surface modifier,
   wherein the surface modifier includes at least one of maleic acid, polydopamine, carboxyl, acetate, phosphoric acid, sulfuric acid, amine, silane, succinic acid, or an alkyl compound; and
   surface-treated inorganic additives with a surface-treatment agent, wherein the surface-treatment agent comprises at least one of maleic acid or polydopamine,
   wherein the cellulose nano fibers and the inorganic additives are dispersed in the matrix, and
   wherein the least some of the inorganic additives dispersed in the matrix are attached to a respective fiber, among the cellulose nano fibers, and
   wherein the cellulose nano fibers have a diameter of 100 nm or smaller.

10. The separator structure of claim 1, wherein the surface modifier at least partially hydrophobizes the cellulose nano fibers to allow an increase in binding force with at least one of the matrix or the inorganic additives.

11. The separator structure of claim 1, wherein at least some of the inorganic additives dispersed in the matrix are not attached to any of the cellulose nano fibers.

12. The separator structure of claim 1, wherein at least some of the inorganic additives dispersed in the matrix are attached to only one fiber among the cellulose nano fibers.

13. A separator structure including a support disposed inside a secondary battery, wherein the support comprises:
   a surface-treated porous polymer matrix with a surface-treatment agent, wherein the surface-treatment agent includes at least one of maleic acid or polydopamine;
   at least partially hydrophobized cellulose nano fibers with a surface modifier to enhance a bonding force between the matrix and the cellulose nano fibers, wherein the surface modifier includes at least one of maleic acid, polydopamine, carboxyl, acetate, phosphoric acid, sulfuric acid, amine, silane, succinic acid, or an alkyl compound; and
   surface-treated inorganic additives with a surface-treatment agent to enhance affinity of at least some inorganic additives to the cellulose nano fibers, wherein the surface-treatment agent comprises at least one of maleic acid or polydopamine,
   wherein the cellulose nano fibers and the inorganic additives are dispersed in the matrix, wherein the least some of the inorganic additives dispersed in the matrix are attached to a respective fiber, among the cellulose nano fibers, and
wherein the cellulose nano fibers have a diameter of 100 nm or smaller.

\* \* \* \* \*